(12) United States Patent
Cao et al.

(10) Patent No.: US 11,325,810 B2
(45) Date of Patent: May 10, 2022

(54) TRACTION SHEAVE SAFETY DEVICE AND ELEVATOR CAR EMERGENCY STOP METHOD THEREOF

(71) Applicant: SUZHOU TORIN DRIVE EQUIPMENT CO., LTD., Changshu (CN)

(72) Inventors: Jianwen Cao, Changshu (CN); He Zhang, Changshu (CN); Wenna Fang, Changshu (CN); Wei Zhou, Changshu (CN); Yu Cao, Changshu (CN); Weike Zhang, Changshu (CN); Huizhu Zhou, Changshu (CN); Yi Cao, Changshu (CN)

(73) Assignee: Suzhou Torin Drive Equipment Co., Ltd., Jiangsu (CN)

( * ) Notice: Subject to any disclaimer, the term of this patent is extended or adjusted under 35 U.S.C. 154(b) by 1055 days.

(21) Appl. No.: 15/527,776

(22) PCT Filed: Jul. 21, 2015

(86) PCT No.: PCT/CN2015/084545
§ 371 (c)(1),
(2) Date: Oct. 24, 2018

(87) PCT Pub. No.: WO2016/078435
PCT Pub. Date: May 26, 2016

(65) Prior Publication Data
US 2019/0047820 A1 Feb. 14, 2019

(30) Foreign Application Priority Data
Nov. 18, 2014 (CN) .......................... 201410659482.1

(51) Int. Cl.
*B66B 5/22* (2006.01)
*F16D 63/00* (2006.01)
(Continued)

(52) U.S. Cl.
CPC .................. *B66B 5/22* (2013.01); *B66B 5/04* (2013.01); *B66B 11/04* (2013.01); *F16D 49/16* (2013.01);
(Continued)

(58) Field of Classification Search
CPC .......... B66B 5/0031; B66B 11/04; B66B 5/04; B66B 5/22; B66B 5/027; B66B 5/18;
(Continued)

(56) References Cited

U.S. PATENT DOCUMENTS 5,007,505 A     4/1991   Lindegger
5,101,939 A *   4/1992   Sheridan .................. B66D 5/14
                                                  188/171
(Continued)

FOREIGN PATENT DOCUMENTS

CN      201647765 U  * 11/2010
CN      201651131 U  * 11/2010  ............... B66B 5/22
(Continued)

OTHER PUBLICATIONS

Xiao-dong Lang et al., An Electromagnetic Brake and Friction Member Thereof, English translation of CN 201651131 U, Nov. 24, 2010 (Year: 2010).*
(Continued)

*Primary Examiner* — Michael R Mansen
*Assistant Examiner* — Michelle M Lantrip
(74) *Attorney, Agent, or Firm* — Greenberg Traurig, LLP

(57) ABSTRACT

A method includes a first brake block of a first brake rubber, a second brake block mounted with a second brake rubber and a mounting base for mounting the first and second brake blocks. The second brake rubber is movable along a direction slanted with respect to an axis of rotation of the traction sheave. A brake block actuation member is triggered by the brake blocks to enable the first and the second brake rubbers to hold the traction sheave. A switching member is also triggered by the action of the second brake rubber, cutting off a safety circuit of the elevator. The external power is cut off, and the brake block actuation member enables contact between the second brake rubber and the traction sheave.
(Continued)

The traction sheave further drives the second brake rubber triggering the brake block members to generate frictional braking force to stop the traction sheave.

6 Claims, 7 Drawing Sheets

(51) Int. Cl.
| | | |
|---|---|---|
| *B66B 11/04* | (2006.01) | |
| *B66B 5/04* | (2006.01) | |
| *F16D 49/16* | (2006.01) | |
| *F16D 49/22* | (2006.01) | |
| *F16D 59/02* | (2006.01) | |
| *F16D 121/22* | (2012.01) | |

(52) U.S. Cl.
 CPC ............ *F16D 49/22* (2013.01); *F16D 59/02* (2013.01); *F16D 63/008* (2013.01); *F16D 2121/22* (2013.01); *F16D 2200/0056* (2013.01)

(58) Field of Classification Search
 CPC . B66B 5/02; F16D 49/16; F16D 49/22; F16D 59/02; F16D 63/008; F16D 2121/22; F16D 55/2265
 See application file for complete search history.

(56) References Cited

U.S. PATENT DOCUMENTS

| | | | |
|---|---|---|---|
| 5,153,389 A | 10/1992 | Nomura | |
| 7,104,367 B2* | 9/2006 | Ferrand | B66D 5/12 |
| | | | 188/170 |
| 2012/0234635 A1* | 9/2012 | Wake | F16D 65/092 |
| | | | 188/73.45 |
| 2014/0299425 A1* | 10/2014 | Schautt | F16D 55/2245 |
| | | | 188/158 |

FOREIGN PATENT DOCUMENTS

| | | | | |
|---|---|---|---|---|
| CN | 102431866 A | * | 5/2012 | |
| EP | 0957059 A2 | * | 11/1999 | ............ B66B 5/22 |
| JP | 2008037611 A | * | 2/2008 | |

OTHER PUBLICATIONS

Wei Zhou et al., A Clamping on the Sheave of the Safety Brake Device, English translation of CN 102431866 A, May 2, 2012 (Year: 2012).*
English Abstracts of Chinese references listed above, 3 pages.
ISA/CN, International Search Report issued on PCT application No. CN2015/084545, dated Sep. 24, 2015, 3 pages.

* cited by examiner

TRACTION SHEAVE SAFETY DEVICE AND ELEVATOR CAR EMERGENCY STOP METHOD THEREOF

CROSS REFERENCE TO RELATED APPLICATION

This application is a national stage application under 35 U.S.C. § 371 claiming priority from International Application No. PCT/CN2015/084545, filed Nov. 18, 2014, entitled "Traction Sheave Safety Device and Elevator Car Emergency Stop Method Thereof" and incorporated herein by reference in its entirety.

FIELD OF THE DISCLOSURE

The present description relates generally to the technical field of elevator safety devices, in particular to a safety device for stopping the traction sheave of an elevator traction machine in an emergency such as when the elevator car operates in an abnormal state, and a method for stopping the elevator car in an emergence by means of the safety device in an elevator system.

BACKGROUND OF RELATED ART

Elevators are indispensable vertical transport means in high-rise buildings, and safety is crucial for elevators. When the elevator car operates abnormally (e.g., the elevator car is over-speed or the elevator car leaves the floor ground when the door of the elevator car is open), the following dangers may occur: the persons are squeezed, impacted, sheared, and fall; the elevator car still runs when it reaches the top floor or bottom floor (hitting the ceiling or touching the ground); the elevator car is over-speed or fall due to broken ropes, etc. To prevent the occurrence of those accidents, the regulatory standards for elevator stipulates special safety devices, such as over-speed protection devices (e.g., governors and safety clamps), over-travel protection devices (e.g., forced deceleration switches and end limit switches), protection devices against hitting the ceiling or touching the ground (e.g., buffers), door safety protection devices (e.g., landing door lock and elevator car door electric interlock, and anti-squeeze device for elevator car door), must be installed on the elevator.

According to the requirements in the regulatory standards, switch components configured to stop the traction sheave quickly, rope grippers configured to stop the steel wire ropes quickly, and safety clamps configured to stop the counterweight quickly or stop the elevator car directly, etc., may also be installed, including safety clamps for clamping the guide rails. All these components are designed to stop the elevator car directly or indirectly to prevent the occurrence of accidents in case that the elevator car operates abnormally.

Among those safety devices, some safety devices for stopping the traction sheave are known. For example, the patent application No. CN101734532B has proposed a "safety brake device applied to the traction sheave of a traction machine", the patent application No. CN102431866B has described a "safety brake device clamped on the traction sheave of a traction machine", and the utility model authorization No. CN200985260Y has provided a "safety clamp applied to a traction sheave". All of the above-mentioned safety devices for stopping a traction sheave employ the following braking scheme: when a governor detects that the elevator car is over-speed, the safety device is mechanically activated and a braking component on the safety device brakes the traction sheave, and thereby stops the elevator car. For example, the patent application No. CN101830381B has an "emergency brake device applied to the traction sheave of a traction machine", which employs an electromagnetic drum brake that is actuated electromagnetically. Though this emergency brake device is simple in structure, adequate electromagnetic attractive force has to be produced to overcome the braking force applied by a pressure spring for braking traction sheave, when the traction sheave is released. To realize this function, the electromagnet must be big enough, the side clearances between the traction sheave and the brake rubber must be small enough and parallel to each other, so that strong electromagnetic force can be generated between the movable iron core and the stationary iron core. Consequently, the emergency brake device inevitably has shortcomings such as large size, requirement for high installation accuracy and strict requirements for installation conditions.

As for safety devices for stopping the steel wire rope, for example, the patent application No. CN102120539B has disclosed an "electromagnetic wedge-shaped two-way rope gripper", which comprises two sets of one-way gripping devices arranged on top and bottom symmetrically; as for safety clamps installed on the elevator car and configured to clamp the guide rail, for example, the Chinese patent application No. CN103663037A has proposed a "two-way braking safety clamp", which consists of left and right braking components that are identical in structure and shape and arranged in central symmetry. Both the two-way rope gripper and the two-way safety clamp consist of two sets of separate braking components configured to brake against up-run over-speed and down-run over-speed respectively, and have drawbacks of high manufacturing cost and complex installation.

In view of the above problems, it is necessary to make improvement to the structure of the safety device for stopping the traction sheave of a traction machine of an elevator emergently.

SUMMARY

The primary object of the present invention is to provide a traction sheave safety device, which has superior performance in structure, weight, cost, installation space, and installation procedures, etc.; more importantly, the magnitude of the frictional braking force generated between the brake rubber of the device and the traction sheave can be adjusted automatically according to the rotating speed of the traction sheave.

Another object of the present invention is to provide an elevator car emergency stop method, which has simple steps and ensures complete implementation of the technical effect of the traction sheave safety device.

The objects of the present invention are attained as follows: a traction sheave safety device, comprising: a pair of brake block components, including a first brake block equipped with a first brake rubber and a second brake block equipped with a second brake rubber; a mounting base on which the first and the second brake blocks are mounted, wherein the first and the second brake rubbers are disposed on the two sides of the traction sheave, and the second brake rubber is movable in an inclined direction with respect to an axis of rotation of the traction sheave; a brake block actuation component, mounted on the mounting base, and configured to trigger the brake block component so that the first and the second brake rubbers hold the traction sheave; and a switching component triggered by the action of the second brake rubber, configured to cut off a safety circuit of the elevator when the elevator car operates abnormally.

Wherein, when the elevator system detects that the elevator car operates abnormally, the elevator system will cut off the power supply, the brake block actuation component will push the second brake block so that the second brake rubber will come into contact with the traction sheave to generate positive pressure, the traction sheave will continue rotating and drive the second brake rubber to move, and then trigger the brake block component to generate enough frictional braking force to stop the traction sheave, the switching component will be triggered instantaneously when the second brake rubber moves to cut off the safety circuit of the elevator; the safety device will be kept at an emergency braking state before the braking is manually released.

In a specific example of the present invention, the traction sheave safety device further comprises a bracket connected with the mounting base and configured to fix the safety device entirely below the traction sheave, wherein the mounting base is movable along the direction of the axis of rotation of the traction sheave with respect to the bracket.

In another specific example of the present invention, the bracket comprises a base plate and a boss arranged on the base plate, a mounting plate of mounting base that can accommodate the boss extends from the mounting base, the boss and the mounting plate of mounting base are arranged with through-holes that are coaxial with each other, guide rods are arranged through the through-holes, and the mounting base is movable along the guide rods with respect to the bracket.

Furthermore, in another specific example of the present invention, the bracket comprises a base plate and two side plates arranged on two sides of the base plate, a mounting plate of mounting base that can be accommodated between the two side plates extends from the mounting base, the two side plates and the mounting plate of mounting base are arranged with through-holes that are coaxial with each other, guide rods are arranged through the through-holes, and the mounting base is movable along the guide rods with respect to the bracket.

Furthermore, in another example of the present invention, the brake block actuation component comprises a casing in which a coil is mounted, a movable iron core and a stationary iron core that are attracted to each other when energized are mounted in the coil, a brake spring is mounted between the movable iron core and the stationary iron core, a push rod is mounted at the side of the movable iron core, and the push rod can push the second brake block to press against the traction sheave under the action of the movable iron core.

Furthermore, in another specific example of the present invention, the brake block actuation component further comprises a guide shaft, one end of the guide shaft is connected with the movable iron core, and the other end passes through the brake spring and the stationary iron core sequentially and then is axially fixed by a nut.

Furthermore, in another specific example of the present invention, the second brake block comprises a wedge block and a brake shoe, the wedge block is fixedly mounted on the mounting base, an upper side wall and a lower side wall extend from the brake shoe above and below of a side of the brake shoe that faces the wedge block in the length direction of the brake shoe, a rolling shaft is pivotally arranged in the middle between the upper side wall and the lower side wall, and the rolling shaft can roll on a mating surface of the wedge block that faces the brake shoe, so that the brake shoe moves with respect to the wedge block.

Furthermore, in another specific example of the present invention, the wedge block is in a symmetric wedge shape with two inclined surfaces, wider at front side and back side and narrower in the middle, and the mating surface consists of two segments of plane surfaces with two ends parallel to the brake rubber surface and a V-shaped surface with two ends gradually inclined towards the brake shoe from the middle.

An elevator car emergency stop method in an elevator system that comprises an elevator car, a traction sheave on an elevator traction machine configured to tow the elevator car to move up and down, and a safety device capable of stopping the traction sheave emergently, comprises the following steps: A) the elevator system detects whether the elevator car operates normally; B) if the elevator system detects that the elevator car operates normally, the safety device will not brake the traction sheave directly or indirectly; C) if the elevator system detects that the elevator car operates abnormally, the elevator system will cut off the power supply to the safety device quickly, the brake block actuation component in the safety device will actuate the brake rubber on one side to come into contact with the traction sheave quickly to generate positive pressure on the traction sheave, and the traction sheave will continue rotating and trigger the safety device to generate enough frictional braking force to stop the traction sheave and thereby stop the elevator car; D) at the moment that the traction sheave continues its action and triggers the safety device to generate enough frictional braking force to stop the traction sheave, the switching component on the safety device cuts off the safety circuit of the elevator; the safety device will be kept at an emergency braking state till the braking is released manually.

Furthermore, in another specific example of the present invention, if the elevator system encounters power outage when the elevator car operates normally, the brake on the elevator traction machine will lose power supply and exercise braking to stop the elevator car, the brake block actuation component in the safety device will trigger the brake rubbers on the two sides to hold the two sides of the traction sheave but generate no frictional braking force after the elevator car is stopped; the safety device will reset automatically once the power supply to the elevator system is recovered.

DETAILED DESCRIPTION

The following description of example methods and apparatus is not intended to limit the scope of the description to the precise form or forms detailed herein. Instead the following description is intended to be illustrative so that others may follow its teachings.

Figure 13:
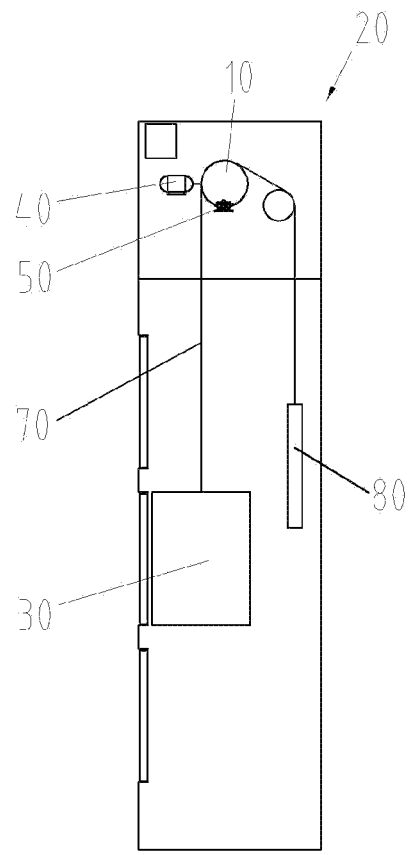
FIG. 13 is a front view of an example elevator system according to the teachings of the present disclosure.
Figure 14:
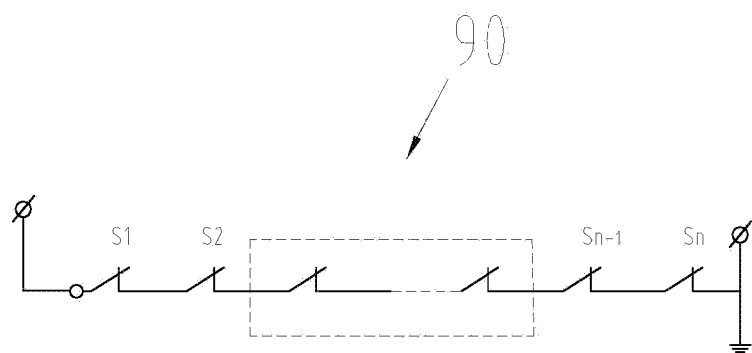
FIG. 14 is an example of a safety circuit for an elevator system according to the teachings of the present disclosure.

As shown in FIGS. 13 and 14, an existing elevator system 20 generally includes a traction machine 40, a guide wheel 60, a steel wire rope 70 wound on the traction sheave 10 of the traction machine 40 and the guide wheel 60, and an elevator car 30 and a counterweight 80 which are connected to the two ends of the steel wire rope 70. The traction sheave 10 on the traction machine 40 rotates, and the steel wire rope 70 rubs against the traction sheave 10 to generate traction, which drives the lifting movement of the elevator car 30 and the counterweight 80 to achieve the purpose of transportation. The present invention relates to a safety protection device 50 with a traction sheave, the device 50 is installed horizontally on the traction machine frame (not shown in the figure), and is located under the traction sheave 10, which is used to quickly clamp the two sides of the traction sheave 10 or the two sides of other parts connected to the traction sheave 10 when the elevator car 30 is running abnormally.

As shown in FIGS. 1, 2, 3, 7 and 12, the present invention relates to a traction sheave safety device, which is horizontally mounted on a traction machine chassis (not shown) below a traction sheave 10, and is configured to quickly grip the two sides of the traction sheave 10 or the two sides of another part connected with the traction sheave 10 when the elevator car operates abnormally; in this example, preferably the safety device directly holds the two sides of the traction sheave 10. The traction sheave safety device comprises a bracket 100, a mounting base 200, a first brake block 300, a second brake block 400, a brake block actuation component 500, a switching component 600, guide rods 1, first screws 2, big spacers 3, second screws 4 and a pressure spring 5.

Figure 1:
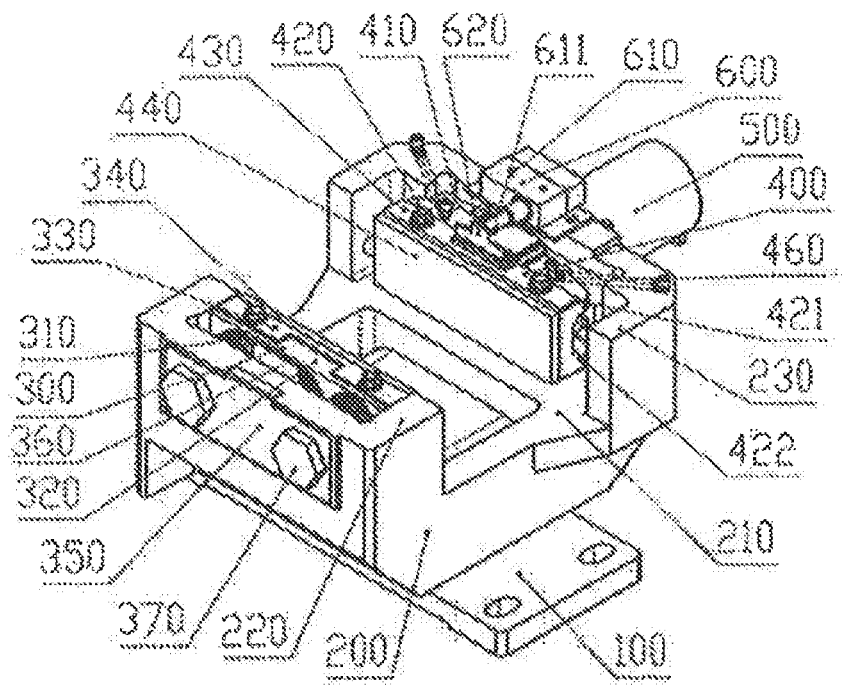
FIG. 1 is a perspective view of an example of the safety device according to the teachings of the present disclosure in one direction.
Figure 2:
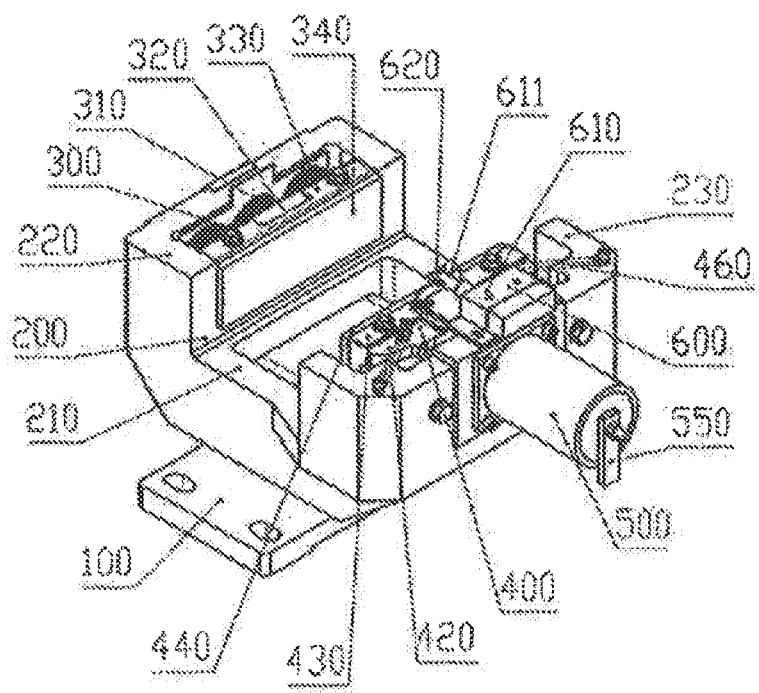
FIG. 2 is a perspective view of an example of the safety device according to the teachings of the present disclosure in another direction.
Figure 3:
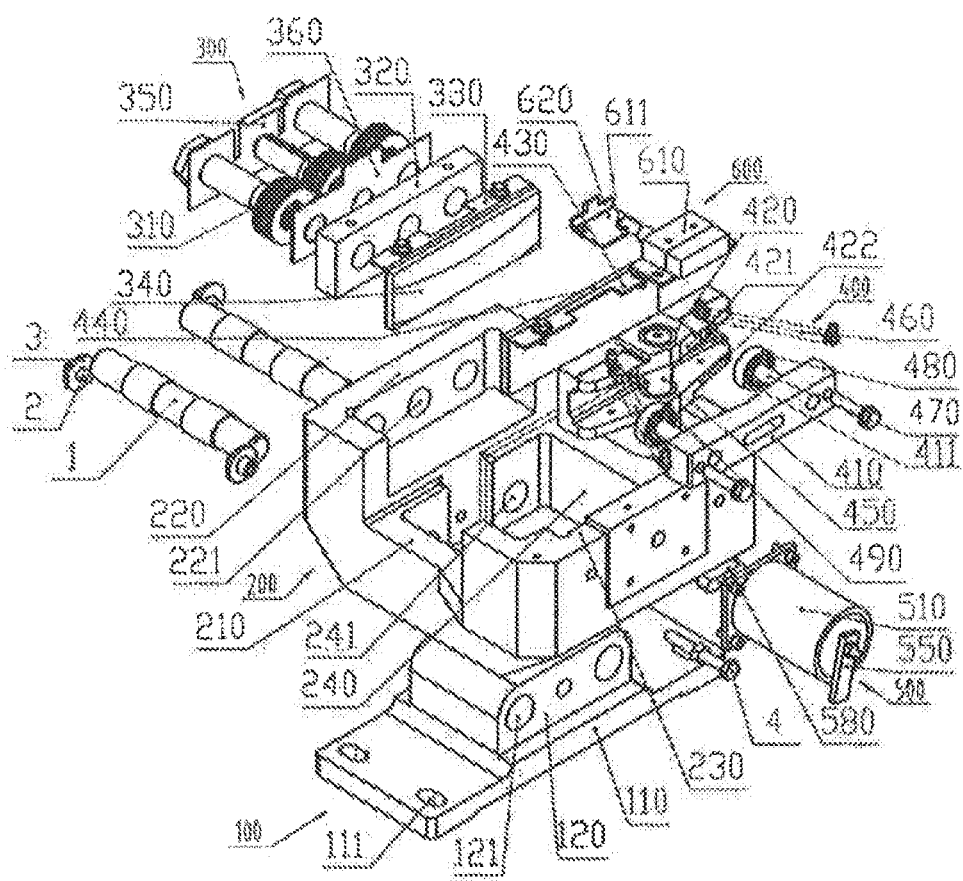
FIG. 3 is an exploded view of an example of the safety device according to the teachings of the present disclosure.
Figure 4:
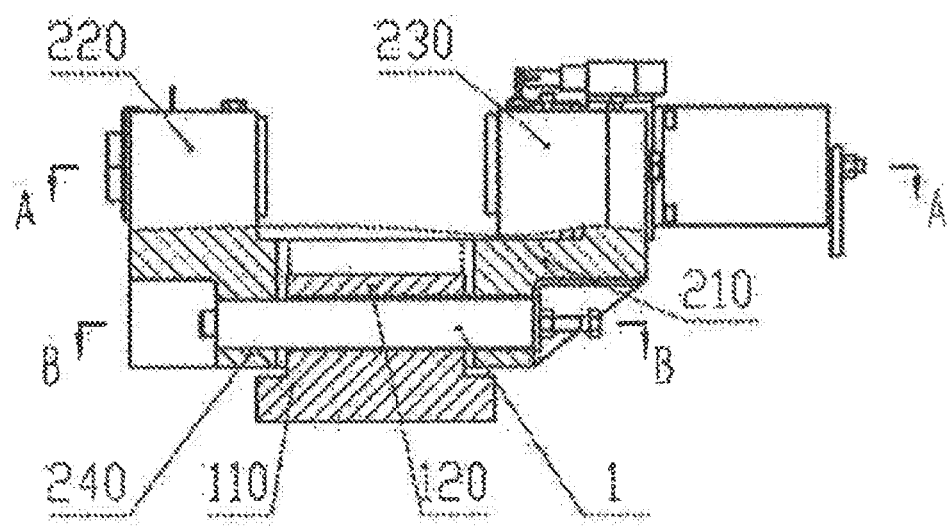
FIG. 4 is a front view of an example of the safety device in a released position according to the teachings of the present disclosure.

As shown in FIGS. 3 and 4, the bracket 100 is horizontally mounted on the traction machine chassis (not shown), and comprises a base plate 110 and a boss 120 extending upwards from the middle part of the base plate 110, the base plate 110 is arranged with mounting holes 111, and is connected with the traction machine chassis by fasteners via the mounting holes 111. The boss 120 is arranged with two boss through-holes 121 that are drilled out perpendicularly in a width direction and parallel to each other.

Figure 7:
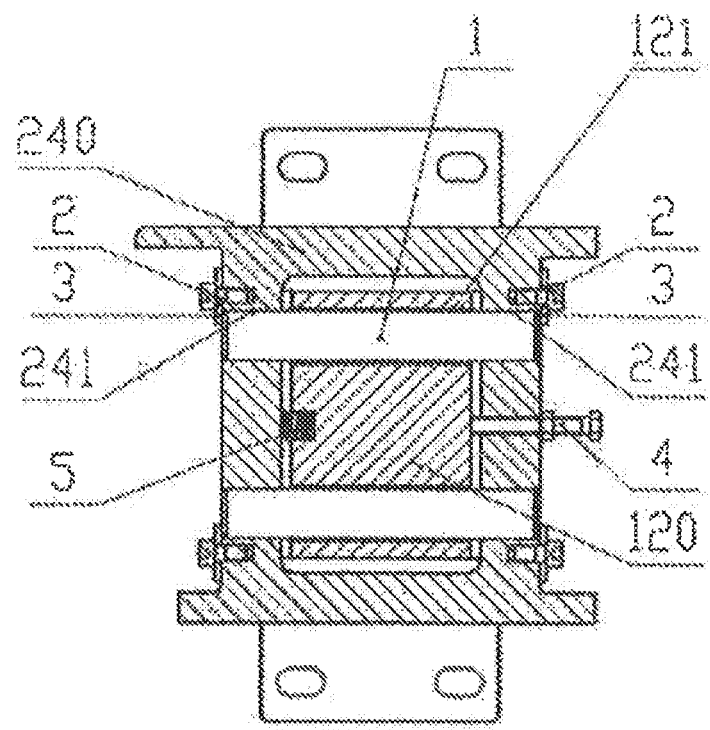
FIG. 7 is a sectional view along line B-B of the device shown in FIG. 4.

As shown in FIGS. 3, 4, 5 and 7, the mounting base 200 comprises a middle plate 210, a first brake block mounting base 220, a second brake block mounting base 230 and a mounting plate of mounting base 240, the mounting plate of mounting base 240 extends downwards under the middle plate 210 to form a cavity in a rectangular shape that can accommodate the boss 120 of bracket 100, and mounting holes 241 which are coaxial with the boss through-holes 121 on the bracket 100 are arranged in both sides of the mounting plate of mounting base 240. During assembly, the bracket 100 is connected with the mounting base 200 via the guide rod 1, the boss 120 on the bracket 100 is inserted into the rectangular cavity of the mounting plate of mounting base 240, the guide rods 1 are inserted into the mounting holes 241 in one side of the mounting plate of mounting base 240 and pass through the boss through-holes 121 and the mounting holes 241 in the other side of the mounting plate of mounting base 240 sequentially, the first screws 2 and the big spacers 3 are fixed adjacent the mounting holes 241, and the big spacers 3 block the ends of the guide rods 1 and thereby prevent the guide rods 1 from sliding off; the second screws 4 are screwed into the right wall of the mounting plate of mounting base 240 and abut against the boss 120 on the bracket 100, and are secured to the mounting plate of mounting base 240 by nuts, the pressure spring 5 is mounted between the boss 120 and the left wall of the mounting plate of mounting base 240 (as shown in FIG. 7), and the pressure spring 5 may be mounted on the boss 120 or the mounting plate of mounting base 240; in this example, preferably the pressure spring 5 is mounted in an internal hole in the boss 120. The second screws 4 and the pressure spring 5 work together so that the mounting base 200 can only move to right and can't move to left with respect to the bracket 100. The first brake block mounting base 220 and the second brake block mounting base 230 extend upwards above both sides of the middle plate 210, and the first brake block mounting base 220 is not connected with the second brake block mounting base 230; instead, a space for receiving the traction sheave 10 is reserved between the first brake block mounting base 220 and the second brake block mounting base 230. The first brake block mounting base 220 is in a "[" shape with a right opening, and is composed of a front side plate, a back side plate, and a left side plate for the first brake block, the left side plate is arranged with first brake block through-holes 221 for fixing the first brake block 300 inside the front side plate, back side plate and left side plate; the second brake block mounting base 230 is in a 1" shape with a left opening, and is composed of a front side plate, a back side plate, and a right side plate for the second brake block, the right side plate is arranged with second brake block through-holes for fixing the second brake block 400 inside the front side plate, back side plate and right side plate.

As shown in FIGS. 1, 2, 3 and 5, the first brake block 300 comprises a disc spring 310, a retaining block 320, a brake rubber retaining frame 330, a first brake rubber 340, a lock spacer 350, a disc spring spacer 360 and a first brake block mounting bolt 370, the first brake rubber 340 and the brake rubber retaining frame 330 are bonded together, and the brake rubber retaining frame 330 has folded edges with through-holes. The retaining block 320 is a cuboid, and is arranged with threaded holes coaxial with corresponding through-holes in the brake rubber retaining frame 330 in the surface that is parallel to the middle plate 210, the brake rubber retaining frame 330 wraps around the retaining block 320 via its folded edges and is fixed to the retaining block 320 by bolts, the first brake rubber 340 bonded to the brake rubber retaining frame 330 corresponds to and is parallel to the left surface of the traction sheave 10. The surface of the retaining block 320 near the left side plate of the first brake block mounting base 220 is arranged with a threaded hole coaxial with the first brake block through-hole 221, the first brake block mounting bolt 370 passes through the lock spacer 350, first brake block through-hole 221, disc spring spacer 360 and disc spring 310 in turn and then is screwed into the threaded hole in the retaining block 320, so that the first brake block 300 is fixedly mounted. The retaining block 320 and the first brake rubber 340 can move left and right in the direction of axis of the traction sheave 10 as the disc spring 310 is compressed or extended.

As shown in FIGS. 1, 2, 3, 5 and 6, the second brake block 400 comprises a wedge block 410, a brake shoe 420, a brake rubber retaining frame 430, a second brake rubber 440, a rolling shaft 450 and tension springs 460.

The second brake rubber 440 and the brake rubber retaining frame 430 are bonded together, and the brake rubber retaining frame 430 has folded edges with through-holes. The brake shoe 420 is arranged with threaded holes that are coaxial with through-holes in the brake rubber retaining frame 430, the brake rubber retaining frame 430 wraps around the brake shoe 420 via its folded edges and is fixed to the side of the brake shoe 420 that faces the traction sheave 10 by bolts, and the second brake rubber 440 bonded to the brake rubber retaining frame 430 corresponds to and is parallel to the right surface of the traction sheave 10.

One side of the wedge block 410 is fixed to the second brake block mounting base 230 by bolts, the other side of the wedge block 410 matches the brake shoe 420, and the wedge block 410 is in a symmetric wedge shape with two inclined surfaces, wider at front side and back side and narrower in the middle; specifically, in this example, the surface of the wedge block 410 facing the brake shoe 420 is a mating surface 411. The mating surface 411 is composed of a V-shaped surface 4111 in the middle and two segments of plane surfaces 4112 extending from both ends of the V-shaped surface. The V-shaped surface 4111 gradually and obliquely extends along the two ends of the brake shoe 420 in the length direction from the middle to the direction of the brake shoe 420. The two segments of plane surfaces 4112 are both parallel to the brake rubber surface of the second brake rubber 440 mounted on the brake shoe 420. Fixing shafts 470 extending towards the brake shoe 420 are mounted at the front and back sides of the mating surface 411 of the wedge block 410 that faces one side of the brake shoe 420, a rolling component that can rotate around the fixing shaft 470 is mounted at an end of the fixing shaft 470 that faces the brake shoe 420, such as a slide bearing or rolling bearing; in this example, preferably the rolling component is a rolling bearing 480. The brake shoe 420 can move forward or backward along the wedge block 410, so as to realize two-way braking of the safety device.

An upper side wall 421 and a lower side wall 422 extend from the brake shoe 420 above and below the side surface of the brake shoe 420 that faces one side of the wedge block 410 in the length direction of the brake shoe 420, and the wedge block 410, fixing shaft 470 and rolling bearing 480 extend into a space formed between the upper side wall 421 and the lower side wall 422. Vertical through-holes are arranged in the middle between the upper side wall 421 and lower side wall 422, the rolling shaft 450 is pivotally arranged in the through-holes via bearings, the middle part of the rolling shaft 450 can roll on the mating surface 411 of the wedge block 410 so that the second brake rubber 440 can move horizontally in a direction inclined with respect to the axis of rotation of the traction sheave; at the same time, the rolling bearings 480 roll on the upper side wall 421 and the lower side wall 422 so that the brake shoe 420 and the wedge block 410 are in a stable rolling fit.

During braking, the brake shoe 420 and the wedge block 410 are in rolling fit, and the distance between the first brake rubber 340 and the second brake rubber 440 is decreased as the brake shoe 420 rolls forward or backward with respect to the wedge block 410. Two tension springs 460 are mounted symmetrically on the two sides of the brake shoe 420, wherein, one end of the tension spring 460 is connected to the brake shoe 420, and the other end of the tension spring 460 is connected to the second brake block mounting base 230. A balance pin 490 is mounted on the upper side wall 421. The function of the tension springs 460 and the balance pin 490 is to maintain smooth movement of the brake shoe 420 with respect to the wedge block 410, i.e., keeping the second brake rubber 440 perpendicular to the axis of the traction sheave 10.

As shown in FIGS. 1, 2, 3, 6 and 10, the brake block actuation component 500 is an electromagnetic actuation component comprising a casing 510, a coil 520, a movable iron core 530, a stationary iron core 540, a brake-releasing handle 550, a brake spring 560, a guide shaft 570 and a push rod 580, wherein, the coil 520 is mounted in the casing 510, the movable iron core 530 and stationary iron core 540 are mounted in the coil 520, the mating surface between the movable iron core 530 and the stationary iron core 540 may be a plane surface or a concave-convex surface, the two ends of the movable iron core 530 and the stationary iron core 540, which are far away from each other after the moving iron core 530 and the static iron core 540 are matched, are matched and closed with the two ends of the housing 510 respectively. One end of the guide shaft 570 is inserted in the internal hole of the movable iron core 530, the other end of the guide shaft 570 passes through the stationary iron core 540 and the brake-releasing handle 550 in turn and then is axially fixed by a nut, the brake spring 560 is mounted between the movable iron core 530 and the stationary iron core 540 and fitted over the guide shaft 570. The brake block actuation component 500 is mounted on the outer side of the second brake block mounting base 230 by bolts, the second brake block mounting base 230 has a through-hole at a position corresponding to the movable iron core 530, the push rod 580 is inserted in the through-hole, one end of the push rod 580 abuts against the movable iron core 530, the other end of the push rod 580 is configured to push the rolling shaft 450; in this example, the push rod 580 is in a T-shape; alternatively, the push rod 580 may be in any other shape, such as a bar shape, a cylindrical shape, or an annular column shape, etc.

In order to ensure that the elevator can run safely, many safety components are installed on the elevator. Only when every safety component is in normal condition, the elevator can run, otherwise the elevator will stop running immediately. Therefore, as shown in FIG. 14, the elevator system 20 also includes a safety circuit 90. Each safety component on the elevator is equipped with a safety switch. All safety switches are connected in series to form a safety circuit 90. As long as one safety component acts, the safety switch on the safety component will be triggered to cut off the safety circuit 90, making the elevator unable to run and ensuring the safety of passengers.

As shown in FIGS. 1, 2, 3 and 5, the switching component 600 comprises a safety switch 610 connected in series in the safety circuit 90 to cut off the safety circuit 90. The safety switch 610 mounted on the second brake block mounting base 230, and an actuation component is arranged on the safety switch 610; in this example, the actuation component is a roller 611; a switch actuation plate 620 is fixedly mounted on the brake shoe 420 and configured to actuate the roller 611 of the safety switch.

Figure 11:
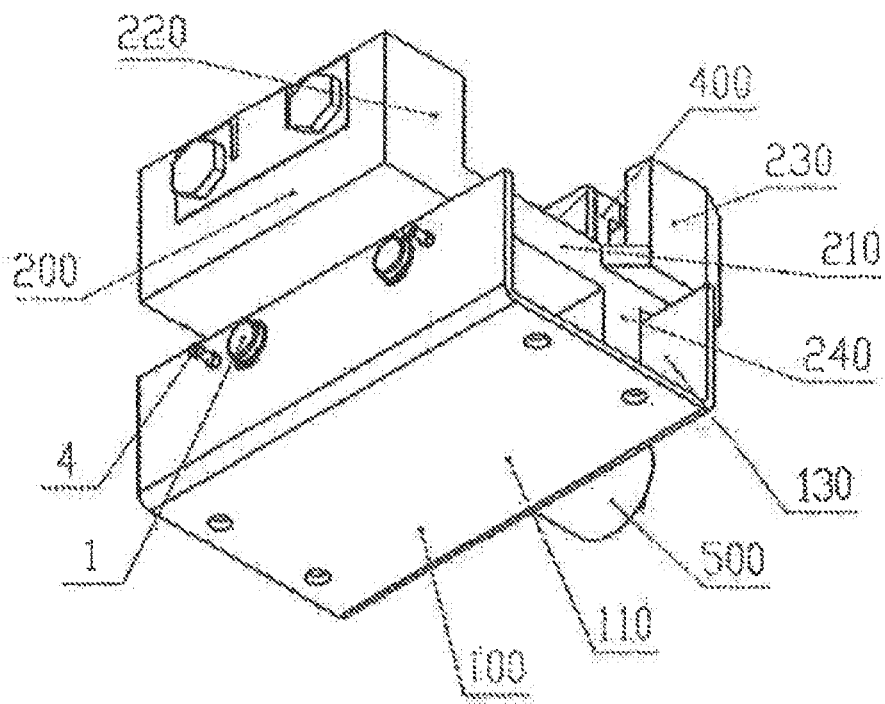
FIG. 11 is a perspective view of another example of the safety device according to the teachings of the present disclosure.
Figure 12:
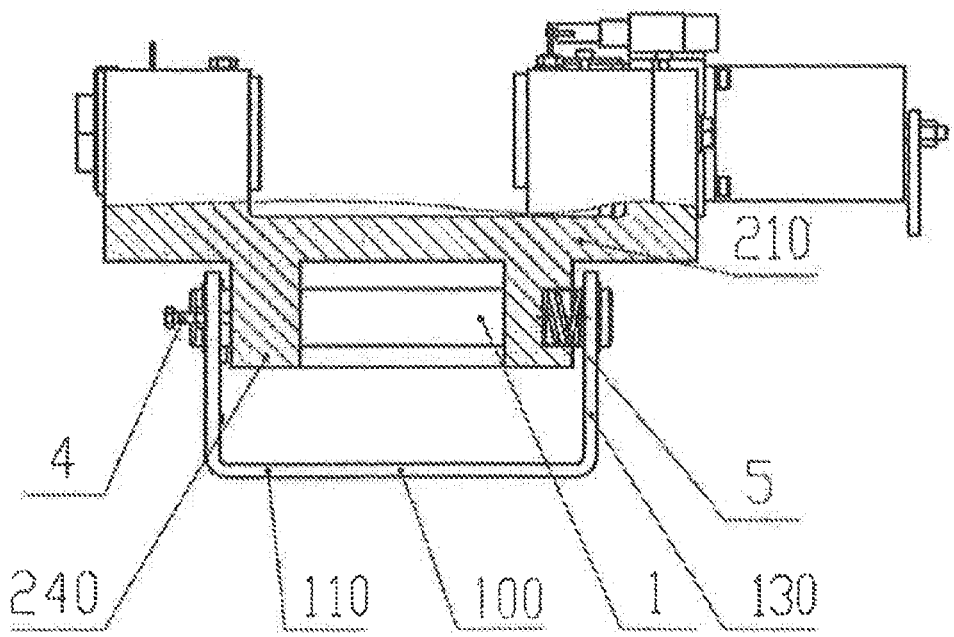
FIG. 12 is a front view of another example of the safety device according to the teachings of the present disclosure.

Please see FIGS. 11 and 12, in this example, the first brake block 300, second brake block 400, brake block actuation component 500 and switching component 600 of the safety device are the same as those in the example 1, but the difference between example 2 and example 1 is that: the structure of the bracket 100 is different. The bracket 100 and the mounting base 200 are fixed as follows: the mounting plate of mounting base 240 is inserted in the bracket 100, the bracket 100 is horizontally mounted on the traction machine chassis (not shown) and comprises a base plate 110 and two side plates 130 arranged on the two sides of the base plate 110, the two side plates 130 extend from the two edges of the base plate 110 in the same direction, two pairs of coaxial through-holes are arranged symmetrically in the side plates 130; the middle plate 210, first brake block mounting base 220 and second brake block mounting base 230 of the mounting base 200 are the same as those in the example 1, the mounting plate of mounting base 240 extends downwards under the middle plate 210 in an "H" shape, and mounting base mounting holes that are coaxial with the through-holes in the side plates 130 are drilled in the left and right side walls of the mounting plate of mounting base 240. During assembly, the bracket 100 is connected with the mounting base 200 via the guide rod 1, the mounting plate of mounting base 240 is inserted into the side plates 130 on the two sides of the bracket 100, the guide rod 1 is inserted into the through-hole in one side plate 130 of the bracket and passes through the mounting base mounting hole and the through-hole in the other side plate 130 of the bracket, and shaft stop rings are mounted on the ends of the guide rod 1 protruding from the side plates 130 to prevent the guide rod 1 from sliding off; the second screws 4 are screwed in the left side plate 130 and abut against the left surface of the mounting plate of mounting base 240, and are secured to the left side plate 130 by nuts, a pressure spring 5 is mounted between the right side plate 130 and the right wall of the mounting plate of mounting base 240 in an internal hole of the mounting plate of mounting base 240. The second screws 4 and the pressure spring 5 work together so that the mounting base 200 can only move to the right and can't move to the left with respect to the bracket 100.

Figure 5:
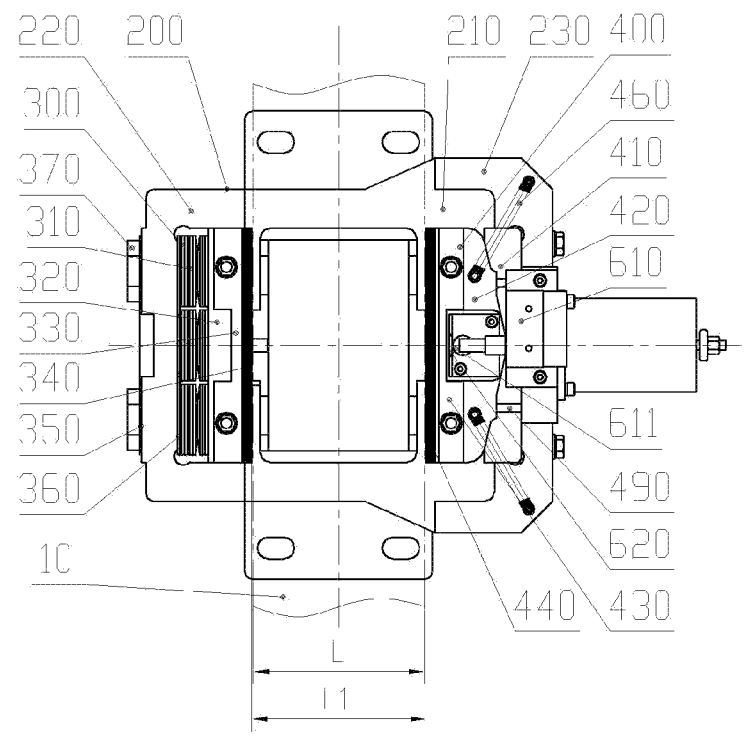
FIG. 5 is a top view of an example of the safety device in a released position according to the teachings of the present disclosure.
Figure 6:
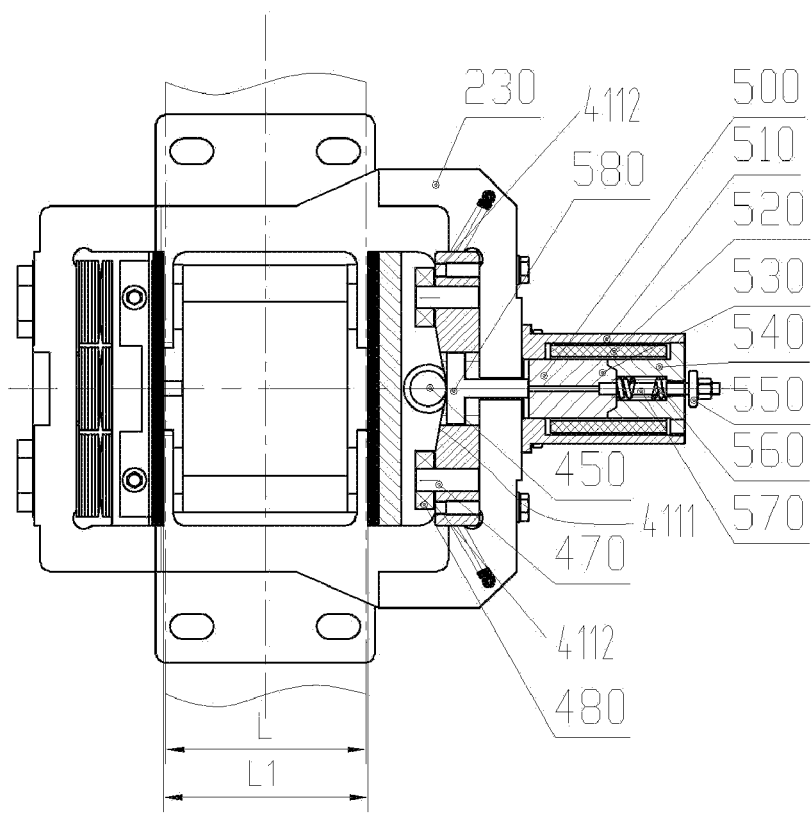
FIG. 6 is a sectional view along line A-A of the device shown in FIG. 4.
Figure 8:
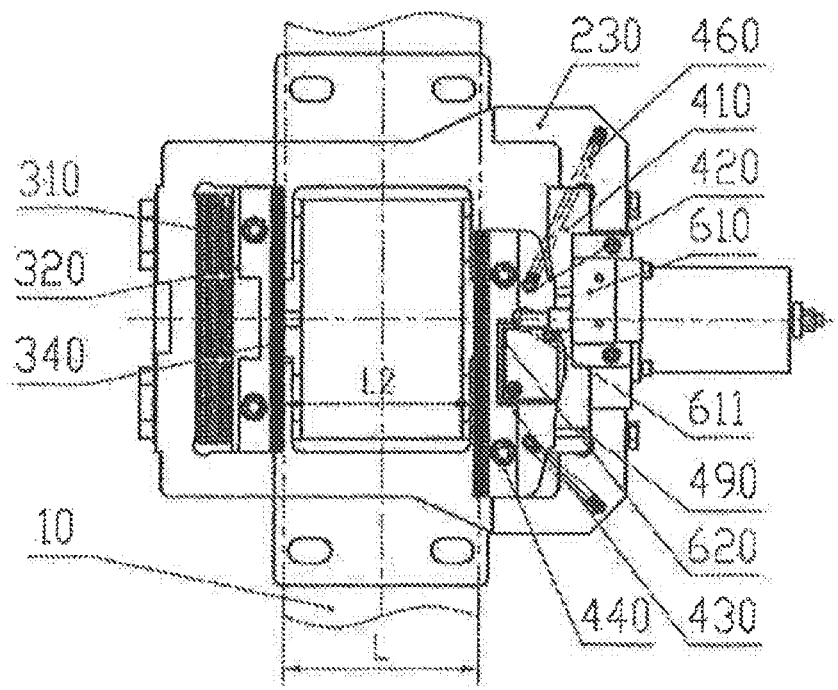
FIG. 8 is a top view of an example of the safety device according to the teachings of the present disclosure, with an assumption that the traction sheave does not exist and the brake shoe is pulled to its limit position.

Please see FIGS. 5 and 8, it is assumed that the width of the traction sheave 10 is L. According to FIG. 5, when the safety device is in released state, the brake shoe 420 is in the middle of the mounting base 200 in front-back direction, the distance between the first brake rubber 340 and the second brake rubber 440 is adjusted to L1, and L1 is greater than L, clearances are reserved between the traction sheave 10 and the left and right brake rubbers, and the sum of the two clearances is L1−L. According to FIG. 8, if the traction sheave 10 does not exist, when the brake shoe 420 is pulled to the front and back sides of the mounting base 200 and abuts against the second brake block mounting base 230, the distance between the first brake rubber 340 and the second brake rubber 440 is the smallest; suppose that distance is L2, the leftward moving distance of the second brake rubber 440 is L1−L2, and adjustment is made to ensure L1−L2>L1−L. Please see FIGS. 5, 6, 7, 9, 10 and 12, hereunder the working principle of the present invention will be described in detail:

As shown in FIG. 6, the entire elevator system is, in its initial, released state, powered and operates normally, the coil 520 in the brake block actuation component 500 is also energized, magnetic field force is generated between the movable iron core 530 and the stationary iron core 540, the stationary iron core 540 attracts the movable iron core 530 to overcome the spring force of the brake spring 560 so that the movable iron core 530 attracts the stationary iron core 540, the brake shoe 420 is in the middle of the mounting base 200 in the front-back direction under the action of the two tension springs 460, and the distance between the first brake rubber 340 and the second brake rubber 440 is L1; therefore, no braking acts on the traction sheave 10. The switch actuation plate 620 on the brake shoe 420 and the safety switch 610 are in ready state. Viewed from the side of the brake block actuation component 500, the traction sheave 10 rotates in clockwise direction.

Figure 9:
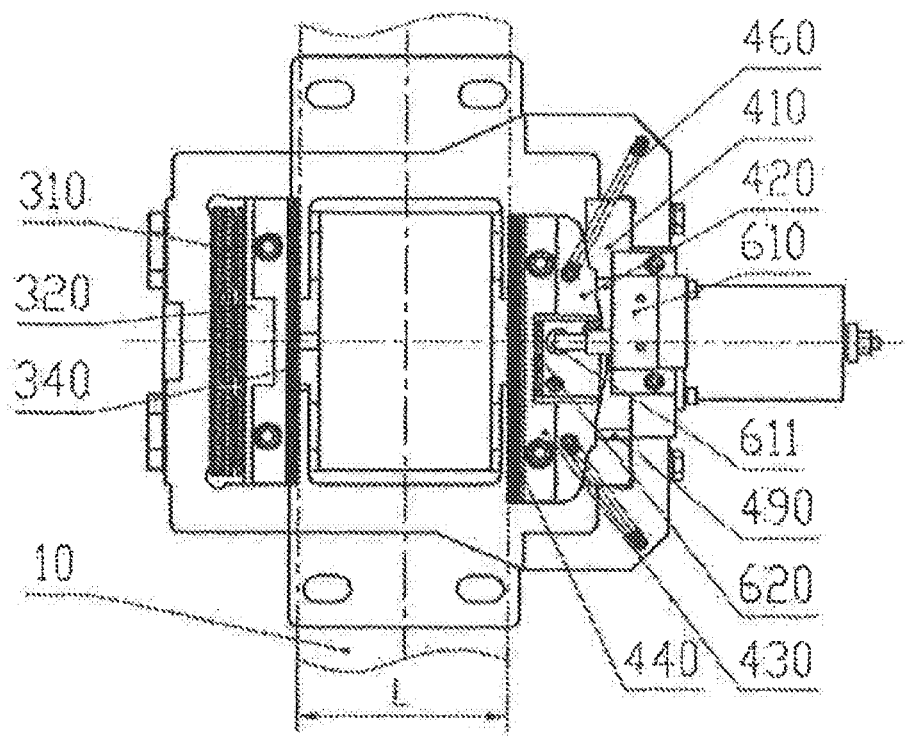
FIG. 9 is a top view of an example of the safety device during normal braking according to the teachings of the present disclosure.

The safety device acts when the elevator system detects abnormal operation of the elevator car As shown in FIGS. 6 and 9 which the safety device is shown in its unreleased state, the brake block actuation component 500 loses power supply, the coil 520 loses power supply, the magnetic field force between the movable iron core 530 and the stationary iron core 540 is lost, the movable iron core 530 pushes the T-shaped push rod 580 under the spring force of the brake spring 560 and thereby pushes the brake shoe 420 to move towards the traction sheave 10; when the second brake rubber 440 comes into contact with the right surface of the traction sheave 10, the second brake rubber 440 exerts initial pressure to the right surface of the traction sheave 10; as the traction sheave 10 continues rotating, initial frictional braking force is generated between the traction sheave 10 and the second brake rubber 440 and drives the second brake rubber 440 to move forward along the mating surface 411 of the wedge block 410; since the mating surface 411 of the wedge block consists of two segments of plane surfaces with two ends parallel to the surface of the brake rubber and a V-shaped surface with two ends gradually inclined from the middle towards the brake shoe 420, the brake shoe 420 with the second brake rubber 440 mounted thereon is subjected to the leftward thrust force of the wedge block 410 during movement; however, owing to the existence of the traction sheave 10, the wedge block 410 can only drive the mounting base 200 to move rightwards along the guide rod 1 under the counterforce of the brake shoe 420, the first brake block 300 also moves rightwards along with the mounting base 200, the first brake rubber 340 on the first brake block 300 moves closer and closer to the left surface of the traction sheave 10; at the moment the first brake rubber 340 comes into contact with the left surface of the traction sheave 10, the disc spring 310 has not been compressed yet, and the distance between the first brake rubber 330 and the second brake rubber 440 is L; if the traction sheave 10 hasn't been stopped by the second brake rubber 440 at that point, the traction sheave 10 will drive the second brake rubber 440 to move forward further (viewed from the side of the brake block actuation component 500, the traction sheave 10 rotates in counter-clockwise direction, here, the traction sheave 10 drives the second brake rubber 440 to move backward), the mounting base 200 continues to move rightwards, but the retaining block 320 can't move rightwards since the first brake rubber 340 presses against the left surface of the traction sheave 10; consequently, the disc spring 310 is compressed by the left side wall of the first brake block mounting base 220 that continues to move, till the pressure of the disc spring 310 causes enough friction force between the first brake rubber 330/the second brake rubber 440 and the two sides of the traction sheave 10 so that the traction sheave 10 is firmly held and thereby the elevator car is stopped, in order to ensure the safety of persons or goods in the elevator car. After the elevator car is stopped, the safety device can be released from braking temporarily by simply pulling the brake-releasing handle 550, and then the traction sheave can be turned to rescue the persons and goods in the elevator car.

The switching component 600 cuts off the safety circuit of the elevator, as shown in FIG. 9, at the moment the second brake rubber 440 is driven by the initial frictional braking force to move, the switch actuation plate 620 on the brake shoe 420 actuates the roller 611 on the safety switch 610, and the safety switch 610 cuts off the safety circuit of the elevator; then, the safety device will be kept at an emergency braking state till the braking is released manually.

As shown in FIG. 6, after the failure is eliminated, the system supplies power to the brake block actuation component 500, magnetic field force is generated between the movable iron core 530 and the stationary iron core 540, the stationary iron core 540 attracts the movable iron core 530 to overcome the spring force of the brake spring 560 so that the movable iron core 530 moves rightwards and relieves the leftward thrust force on the T-shaped push rod 580; thus, the components are recovered to their initial state under the action of the pressure spring 5, disc spring 310 and tension springs 460.

Figure 10:
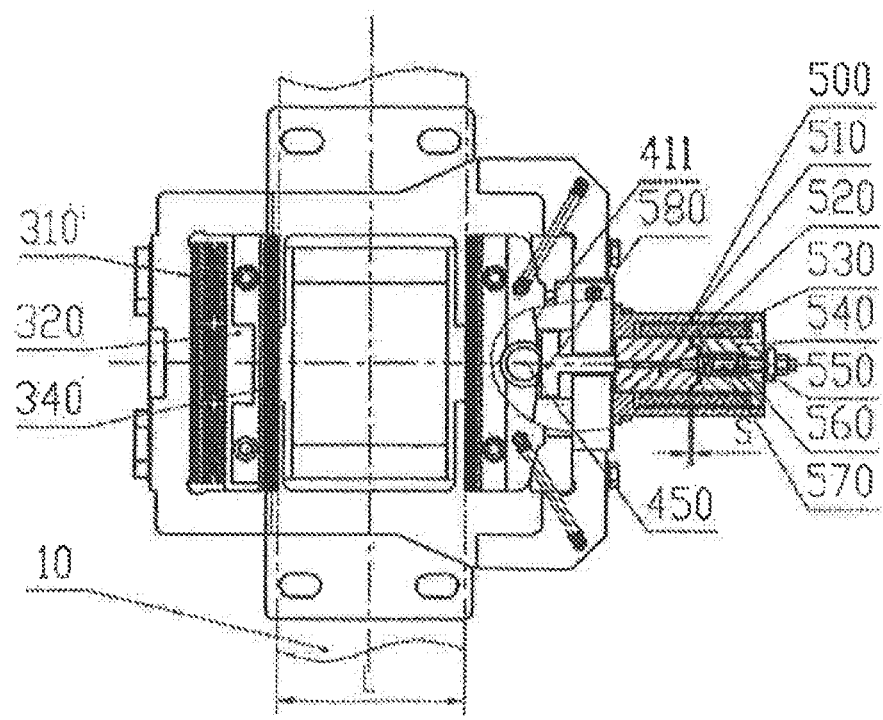
FIG. 10 is a schematic structural diagram of the safety device according to the teachings of the present disclosure, when the safety device breaks the stopped traction sheave in case that the elevator car operates normally but the elevator system loses power supply.

As shown in FIG. 10, if the elevator system encounters power outage when the elevator car operates normally, the elevator circuit will control the service brake on the traction machine to interrupt power supply and exercise braking to stop the elevator car. After the elevator car is stopped, the brake block actuation component will trigger the brake rubbers on the two sides to hold the two sides of the traction sheave, to prevent personal injury accidents incurred by excessive deceleration resulted from rapid braking exercised by the safety device on the traction sheave. Specifically, the working process is: in case of power outage of the elevator system, the traction machine loses power first, and the service brake on the traction machine exercises braking so that the elevator car is stopped normally, smoothly and steadily. The circuit of the elevator system delays outage of the brake block actuation component 500; then, the coil 520 is de-energized, the magnetic field force between the movable iron core 530 and the stationary iron core 540 is lost, the movable iron core 530 pushes the T-shaped push rod 580 under the spring force of the brake spring 560 and thereby pushes the brake shoe 420 to move towards the traction sheave 10; when the second brake rubber 440 comes into contact with the right surface of the traction sheave 10, the second brake rubber 440 has a pressure on the right surface of the traction sheave 10; at that point, since the traction sheave 10 has been stopped normally by the service brake of the traction machine, no frictional braking force is generated between the traction sheave 10 and the second brake rubber 440; therefore, the traction sheave 10 will not drive the second brake rubber 440 to move forward; owing to the existence of the traction sheave 10, the brake shoe 420, T-shaped push rod 580 and movable iron core 530 cannot move leftwards, and the brake spring 560 can only force the stationary iron core 540 to drive the casing 510 with the stationary iron core 540 mounted thereon and the mounting base 200 connected with the casing 510 to move rightwards, so that the mounting base 200 overcomes the spring force of the pressure spring 5 and moves rightwards with the first brake block 300 along the guide rod 1, till the first brake rubber 340 and the second brake rubber 440 hold the two sides of the traction sheave 10 and the forces generated by the pressure spring 5, disc spring 310, tension springs 460 and brake spring 560 reach a balanced state. The safety device will automatically reset when the power supply to the elevator system is recovered.

When the mounting base 200 in the examples 1 and 2 moves rightwards, the retaining block 320 and the mounting base 200 will compress and deform the disc spring 310, so that the disc spring 310 generates holding force for the first brake rubber 340 and the second brake rubber 440 to hold the traction sheave 10. The function of the mounting base 200 and disc spring 310 can be implemented by means of a U-shaped plate spring.

With the above-mentioned structure and method, the present invention has the following advantages: advantage 1: the energy for the safety device to stop the elevator car when the elevator car operates abnormally comes from the elevator system itself, such as weight difference between the counterweight and the elevator car or the power output torque of the motor; the magnitude of the frictional braking force generated between the brake rubber of the safety device and the two sides of the traction sheave is automatically regulated according to the rotating speed of the traction sheave, and thereby injury accidents caused by excessive deceleration in emergency braking of the elevator car under the same frictional braking force in existing products can be avoided.

Advantage 2: when the elevator car is in an over-speed state or any other abnormal operation state (e.g., the elevator car leaves the floor ground when the elevator car door is open), the elevator system will cut off the power supply immediately once it detects the abnormality of the elevator car, the safety device will hold the traction sheave quickly and thereby stop the elevator car owing to power loss, so as to protect the safety of persons and goods in the elevator car; the device achieves multiple functions of governor, safety clamp, up-run over-speed protection device and door safety device, has superior overall performance, and is simple in structure.

Advantage 3: at the moment that the traction sheave rotates and drives the second brake rubber to move, the travel switch cuts off the safety circuit of the elevator; then, the safety device is kept in a braking state till the failure is manually solved, so as to ensure the safety of persons and goods in the elevator car and enable the elevator to operate safely again.

Advantage 4: if the safety device is triggered by power loss of the system, the brake block actuation component will lose power, the brake spring will push the movable iron core so that the second brake rubber will exert low initial braking force on the traction sheave, and thereby trigger the safety device to generate enough braking force to stop the traction sheave; when the traction sheave is released, the brake block actuation component is energized and the coil is energized, the spring force of the brake spring can be overcome by low electromagnetic attractive force generated between the movable iron core and the stationary iron core; hence, the brake block actuation component consisting of the coil, the movable iron core, stationary iron core and brake spring can be made in a small size; the wedge block is in a symmetric wedge shape, wider at front and back sides and narrower in the middle, and works with the brake shoe to constitute a brake block component, which works with another brake block component to constitute a set of brake component that supports two-way braking; hence, there are less parts and components, and the structure is compact; as a result, the safety device has small size and low cost; in addition, the safety device doesn't occupy shaft space since it is mounted on a chassis below the traction sheave, thus the safety device is convenient to install.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A traction sheave safety device, comprising:
a pair of brake block components, including a first brake block equipped with a first brake rubber and a second brake block equipped with a second brake rubber;
a mounting base on which the first brake block and the second brake block are mounted, wherein the first brake rubber and the second brake rubber are disposed on the two sides of a traction sheave, and the second brake rubber is movable in an inclined direction with respect to an axis of rotation of the traction sheave;
a brake block actuation component, mounted on the mounting base, and configured to trigger the brake blocks so that the first brake rubber and the second brake rubber hold the traction sheave; and
a switching component triggered by the movement of the second brake rubber along the oblique direction to the axis of the traction sheave and configured to electrically break a safety circuit of an elevator when an elevator car operates abnormally;
a bracket connected with the mounting base and configured to fix a safety device entirely below the traction sheave, and the mounting base is movable along the direction of the axis of rotation of the traction sheave with respect to the bracket;
wherein, the second brake block comprises a wedge block and a brake shoe, a side of the wedge block away from the traction sheave is fixedly mounted on the mounting base, another side of the wedge block close to the traction sheave is mated with the brake shoe; an upper side wall and a lower side wall extend from the brake shoe in the longitudinal direction above and below a side of the brake shoe that faces the wedge block, a rolling shaft is pivotally arranged in Amendment and Response to Office Action the middle between the upper side wall and the lower side wall, and the rolling shaft can roll on a side surface of the wedge block that faces the brake shoe, so that the brake shoe moves with respect to the wedge block;
wherein an elevator system is configured to detect that the elevator car operates abnormally, the elevator system is configured to, in response to a detection that the elevator car operates abnormally:
cut off a power supply to the elevator system,
cause the brake block actuation component to push the second brake block after power-off so that the second brake rubber comes into contact with the traction sheave to generate positive pressure, wherein the traction sheave is configured to continue its rotation and drive the second brake rubber to move in the direction inclined to the axis of the traction sheave, and
trigger the brake block component to generate a frictional braking force to stop the traction sheave, wherein the switching component is configured to be triggered at the moment the second brake rubber moves so as to electrically break the safety circuit of the elevator;
wherein the safety device is configured to be kept at an emergency braking state until braking components are manually released.

2. The traction sheave safety device according to claim 1, wherein, the bracket comprises a base plate and a boss arranged on the base plate, a mounting plate of mounting base that can accommodate the boss extends from the mounting base, the boss and the mounting plate of mounting base are arranged with through-holes that are coaxial with each other, guide rods are inserted in the through-holes, and the mounting base is movable along the guide rods with respect to the bracket.

3. The traction sheave safety device according to claim 1, wherein, the bracket comprises a base plate and two side plates arranged on two sides of the base plate, a mounting plate of mounting base that can be accommodated between the two side plates extends from the mounting base, the two side plates and the mounting plate of mounting base are arranged with through-holes that are coaxial with each other, guide rods are inserted in the through-holes, and the mounting base is movable along the guide rods with respect to the bracket.

4. The traction sheave safety device according to claim 1, wherein, the brake block actuation component comprises a casing, a coil is mounted inside the casing, a movable iron core and a stationary iron core mounted in the casing attract one another when energized, a brake spring is mounted between the movable iron core and the stationary iron core, the two ends of the movable iron core and the stationary iron core, which are far away from each other after the moving iron core and the static iron core are matched, are matched and closed with the two ends of the housing respectively, a push rod is mounted at the side of the movable iron core adjacent to the traction sheave, and the push rod is configured to push the second brake block to press against the traction sheave under the action of the movable iron core.

5. The traction sheave safety device according to claim 4, wherein, the brake block actuation component further comprises a guide shaft, one end of the guide shaft is connected with the movable iron core, and the other end of the guide shaft passes through the brake spring and the stationary iron core sequentially and then is axially fixed by a nut.

6. The traction sheave safety device according to claim 1, wherein, the wedge block is in a symmetric wedge shape with two inclined surfaces, wider at a front side of the wedge block and a back side of the wedge block and narrower in a middle of the wedge block, wherein the two inclined surfaces of the wedge block facing the brake shoe form a mating surface and the mating surface consists of a V-shaped surface in the middle and two segments of plane surfaces extending from both ends of the V-shaped surface, the V-shaped surface gradually and obliquely extends along the two ends of the brake shoe in the longitudinal direction from the middle to the direction of the brake shoe, the two segments of plane surfaces are both parallel to the brake rubber surface of the second brake rubber mounted on the brake shoe.

* * * * *